United States Patent [19]
Rich

[11] 3,854,139
[45] Dec. 10, 1974

[54] AIRCRAFT PROXIMITY ALERT

[76] Inventor: Alan H. Rich, 9910 Jacqueline Dr., Oxon Hill, Md. 20022

[22] Filed: Oct. 25, 1972

[21] Appl. No.: 300,606

[52] U.S. Cl. .................... 343/112 CA, 343/106 R
[51] Int. Cl. ............................................. G01s 1/44
[58] Field of Search ...... 343/106 R, 112 CA, 105 R

[56] References Cited
UNITED STATES PATENTS

| | | | |
|---|---|---|---|
| 3,025,521 | 3/1962 | Tatel et al. | 343/106 R |
| 3,091,764 | 5/1963 | Tatel | 343/106 R |
| 3,550,129 | 12/1970 | Steele | 343/112 CA |
| 3,680,115 | 7/1972 | Bickel et al. | 343/105 R |

*Primary Examiner*—Maynard R. Wilbur
*Assistant Examiner*—G. E. Montone
*Attorney, Agent, or Firm*—R. S. Sciascia; Arthur L. Branning

[57] ABSTRACT

A VOR system is modified in order to provide proximity information to approaching, threatening aircraft. Each aircraft may effectively act as an "airborne VOR" so as to retransmit its own VOR position on another but known frequency so that another aircraft may be apprised of its position. This simple inexpensive system is well suited for smaller, light weight aircraft.

5 Claims, 5 Drawing Figures

AIRCRAFT PROXIMITY ALERT

STATEMENT OF GOVERNMENT INTEREST

The invention described herein may be manufactured and used by or for the Government of the United States of America for governmental purposes without the payment of any royalties thereon or therefor.

BACKGROUND

The United States and Canada are dotted with VOR ground stations so as to provide navigational capability from one selected point to another. The ground station radiates a reference signal of constant phase and a signal having a phase which varies as the electromagnetic fields associated with the radiating antenna of the ground station simultaneously increase and decrease in the various quadrants. The phase relation of the two signals is made to be zero when the scanned field of the antenna passes through magnetic north. The degree of phase shift as seen by an aircraft receiving the signals depends upon the bearing of the aircraft from the VOR station. The transmitted reference and variable phase signals received by the aircraft are applied to a phase comparison circuit such as that found in a VOR receiver and a signal is obtained therefrom to provide an indication of the bearing of the aircraft.

Generally, a pilot who desires to maintain a particular heading selects the correct VOR station from his flight plan and sets his VOR receiver on the frequency which corresponds to that station. The VOR receiver indicates to the pilot whether he is flying to or from the VOR and if he is to the left or right of his selected flight path. After the aircraft passes the VOR station, the pilot chooses a new VOR at a different frequency and continues his flight. However, it is well known that the air-space close to the VOR navigational station is congested because of the numerous flight paths which converge at this point. Obviously this is a dangerous situation especially for lighter, lower speed aircraft which are neither equipped with transponder or collision avoidance equipment.

Considering the problem of congested airspace, particularly around the VOR station, I have developed a method and a device to inform an aircraft of the presence of another aircraft which may result in a possible collision threat.

OBJECTS

It is an object of the present invention to provide a proximity information alert for approaching aircraft and alternately to alert the pilot if an aircraft is on his flight path.

A further object of this invention is to provide a method for proximity information alert that employs existing VOR facilities.

Another object of this invention is to provide an inexpensive device that warns of possible threatening aircraft which requires a minimum of equipment modifications.

Another object of this invention is to inform the pilot of the relative course changes of a threatening craft such that separate flight paths may be maintained.

Other objects and advantages of this invention will become apparent from the following detailed description of the invention when considered in conjunction with the acompanying drawings wherein:

DRAWINGS

SUMMARY

Aircraft are provided with a method and a modified VOR receiver for determining the proximity of threatening aircraft around a VOR station by making each aircraft retransmit its received VOR information. Any aircraft equipped with the modified VOR receiver may obtain proximity information from the closest aircraft.

The method may be implemented simply and inexpensively by retransmitting the aircraft's VOR bearing information at a different but known frequency and at a standardized strength. When another aircraft receives this retransmission, the proximity information of the first aircraft will be available and is capable of being displayed by a typical VOR receiver.

DETAILED DESCRIPTION

Figure 1:
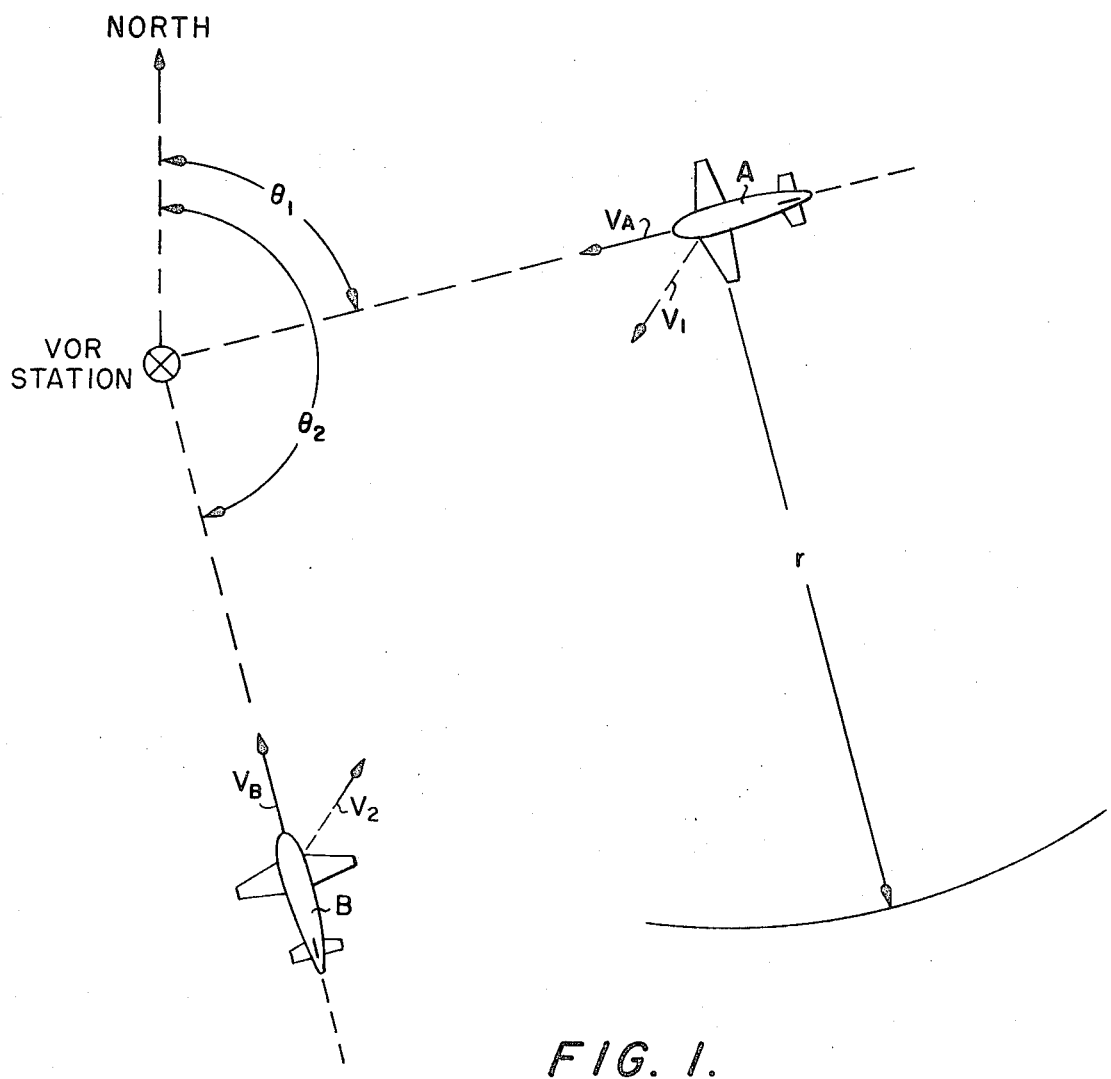
FIG. 1 is a representation of two aircraft approaching a common VOR station.

Referring to FIG. 1, two aircraft A and B are shown in the vicinity of the VOR station. FIG. 1 depicts a rather typical situation in which two aircraft, and possibly other aircraft, (not shown) are employing a common VOR for navigational capability. Aircraft A and B are shown to be headed for the VOR station on flight paths $\vec{V}_A$ and $\vec{V}_B$. With, aircraft A heading toward the VOR station at an angle of $\theta_1$ and aircraft B heading toward the VOR at an angle $\theta_2$, as the aircraft converge upon the VOR station, the possibility of a collision increases. When aircraft A is equipped with the proximity alert transmission system such as that shown in FIG. 2, it is able to assume the characteristics of an "airborne VOR." Thus, aircraft B or any other aircraft capable of receiving the signal from aircraft A's frequency shifted transmission may have access to the information required to apprise him of A's approximate position.

Specifically, assume aircraft A, heading toward the VOR at angle $\theta_1$, is equipped with the well known prior art VOR receiver 10. The indicator shows the pilot that he is heading TO the VOR and that the VOR is neither to the left or right but is centered straight ahead. Namely aircraft A has received his flight angle $\theta_1$ from the VOR, measured from the reference of true north.

Figure 2:
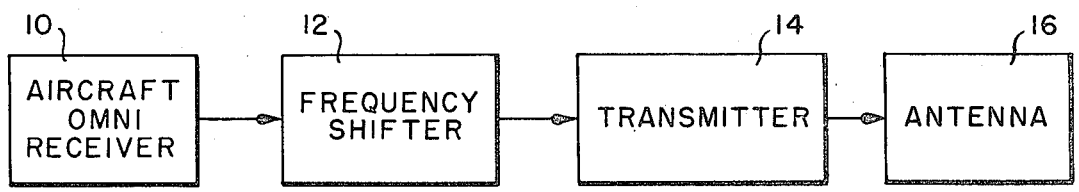
FIG. 2 is a block diagram of the proximity information alert device.

Referring to FIG. 2 this bearing signal which is obtained from the omni receiver 10 is applied to a frequency shifter such that the frequency of the VOR is changed by a known standarized amount, say 100 KHz for example, while maintaining the original phase relationships. The shifted frequency signal is continuously transmitted by transmitter 14 by way of antenna 16 and contains $\theta_1$ information. The power of transmitter 14 and the type of antenna 16 determines the field strength of the frequency shifted transmission, and the transmission radius $r$ should be kept at a rather short distance. The reason for keeping the transmission radius short is that only the aircraft in the immediate vicinity of aircraft A are interested in the $\theta_1$ information.

If aircraft B is equipped with the well known VOR receiver, angle $\theta_2$ will be available and the indicator will show the pilot that aircraft B is heading toward the VOR, on center ($\vec{V_B}$). However if aircraft B is equipped with the additional omni receiver system tuned to receive the frequency shifted signal from aircraft A or if he retunes a single receiver periodically to receive the frequency shifted signal, the bearing angle $\theta_1$ will be available to aircraft B as soon as both aircraft fall within the transmission radius r. As a result the proximity of aircraft A is available to the pilot of aircraft B since the $\vec{V_1}$ and $\vec{V_2}$ line is established and continually monitored.

To implement this system the amount of the frequency shift must be standardized such that when pilot B tunes in a VOR station he also knows the frequency at which he will receive the corresponding "airborne VOR" reception. Also the strength of transmitter 14 should also conform to a standard so that a VOR receiver may indicate the position of the closest most threatening aircraft and on the basis of signal strength alone reject the others.

Figure 3:
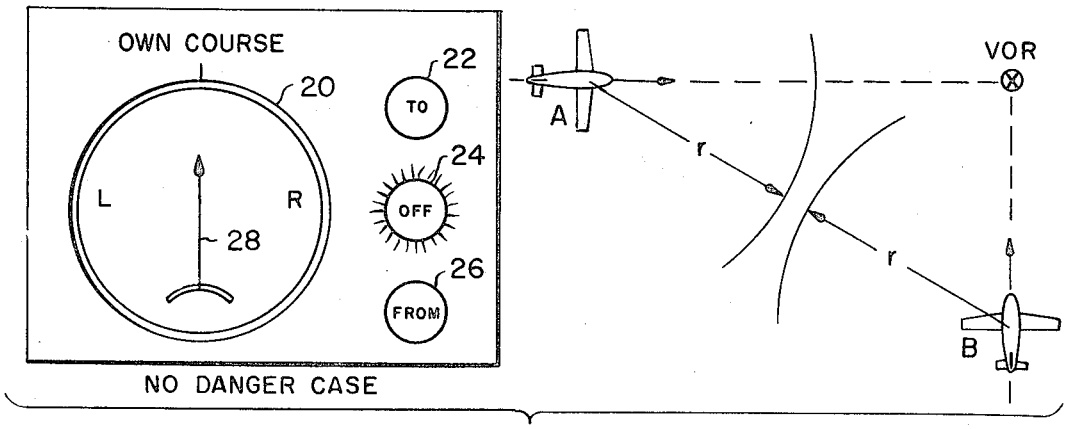
FIGS. 3–5 depict different conditions of the VOR receiver capable of receiving the frequency shifted signal.

FIG. 3 typifies the case where aircraft B, equipped with the receiver capable of receiving the shifted VOR frequency, is in no immediate danger of a collision. Specifically, the aircraft are not within the radius of transmission and as a result, the insufficient signal light 24 is OFF. However, when the "0" bearing selector 20 is set to "own course" and the aircraft B enters the standardized radius of transmission, the course deviation needle 28 will swing to the right to indicate the presence of aircraft A.

Figure 4:
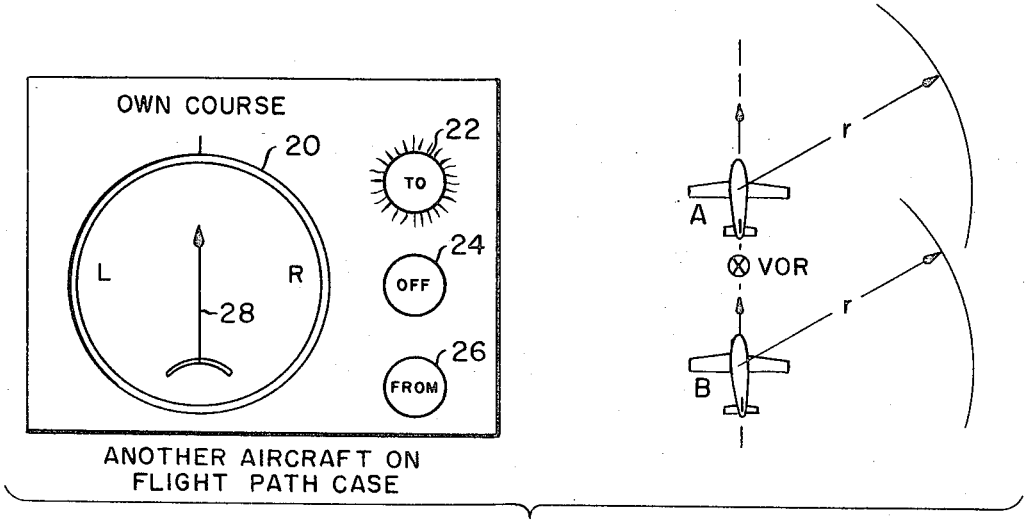

Referring to FIG. 4, two aircraft A and B are on the same flight path with the VOR disposed between them. Assume that aircraft B is traveling at a greater velocity relative to aircraft A, and if a course change is not made by either of the two aircraft a collision will result. Since the aircraft B is on A's flight path, and the "0" bearing selector 20 is set on A's own course, the deviation needle 28 will be centered and the TO light 22 will be on. This indicates to the pilot of aircraft A that he must steer either left or right to avoid a possible collision.

Figure 5:
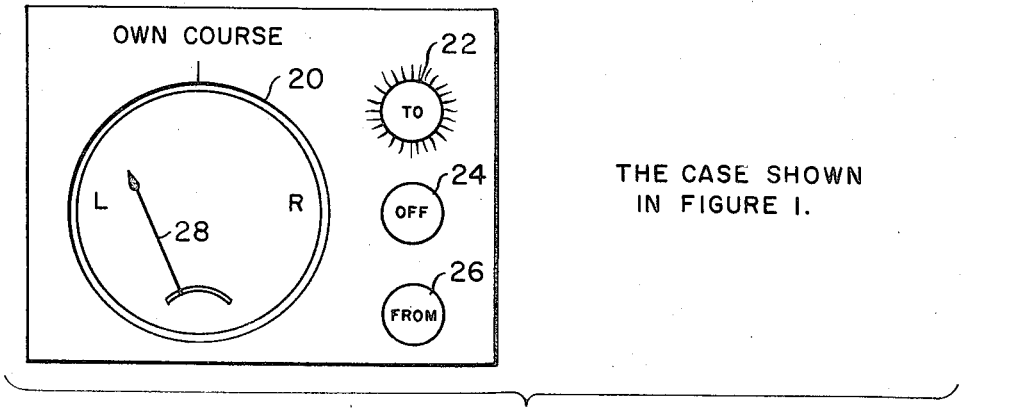

FIG. 5 depicts the condition of the VOR receiver in the aircraft A of FIG. 1. As is readily apparent, the "0" bearing selector 20 is set to B's own course, the course deviation needle 28 is to the left, and the TO light 22 is on. Thus, aircraft A must steer left in order to intercept aircraft B's flight path.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of providing a first aircraft with proximity information of a second aircraft wherein said second aircraft is in the vicinity of a VOR comprising:
   receiving the VOR signal at said second aircraft;
   frequency shifting said received signal while maintaining its respective phase properties;
   retransmitting said frequency shifted signal at a fixed power level at said second aircraft;
   receiving said retransmitted signal at said first aircraft when said first aircraft is within range of said retransmitted signal.

2. The method as claimed in claim 1 further including:
   indicating at said first aircraft whether said second aircraft is either left, right or center of said first aircraft.

3. The method as claimed in claim 2 including:
   providing TO/FROM information of said second aircraft at said first aircraft.

4. A proximity alert system for aircraft equipped with a VOR receiver comprising:
   means coupled to said VOR receiver to frequency shift a received VOR signal, and means coupled to said frequency shift means for retransmitting said frequency shifted signal at a fixed power level.

5. The system as defined in claim 4 wherein said VOR receiver is positioned in a first aircraft, and further including means positioned in a second aircraft for receiving said retransmitted signal when said second aircraft is within range of said retransmitted signal.

* * * * *